(12) United States Patent
Kabanov

(10) Patent No.: US 8,261,297 B2
(45) Date of Patent: Sep. 4, 2012

(54) METHOD AND ARRANGEMENT FOR RE-LOADING A CLASS

(75) Inventor: Evgueni Kabanov, Tartu (EE)

(73) Assignee: Zeroturnaround Ou, Tartu (EE)

( * ) Notice: Subject to any disclaimer, the term of this patent is extended or adjusted under 35 U.S.C. 154(b) by 980 days.

(21) Appl. No.: 12/117,209

(22) Filed: May 8, 2008

(65) Prior Publication Data

US 2008/0282266 A1 Nov. 13, 2008

(30) Foreign Application Priority Data

May 9, 2007 (FI) ...................................... 20070366

(51) Int. Cl.
*G06F 9/45* (2006.01)
(52) U.S. Cl. ...................................................... 719/332
(58) Field of Classification Search ........................ None
See application file for complete search history.

(56) References Cited

U.S. PATENT DOCUMENTS

| | | | |
|---|---|---|---|
| 6,223,344 B1 | 4/2001 | Gerard et al. | |
| 7,278,139 B2 * | 10/2007 | Talwar et al. | 717/168 |
| 2003/0056022 A1 * | 3/2003 | Carlson et al. | 709/315 |
| 2003/0200350 A1 * | 10/2003 | Kumar et al. | 709/315 |
| 2004/0015936 A1 * | 1/2004 | Susarla et al. | 717/166 |
| 2004/0261069 A1 * | 12/2004 | Verbeke et al. | 717/166 |

OTHER PUBLICATIONS

Michael G. Zinner, "The all-new MySQL Server Windows Installer" http://web.archive.org/web/20060923090346/http://en.wikipedia.org/wiki/Reflection_%28computer_science%29.
Wikipedia, "Reflection (computer science)" http://web.archive.org/web/20070101205658/http://dev.mysql.com/tech-resources/articles/4.1/installer.html.

* cited by examiner

*Primary Examiner* — Andy Ho
*Assistant Examiner* — Paul M Kim
(74) *Attorney, Agent, or Firm* — DLA Piper LLP US

(57) ABSTRACT

The method is for deploying an input class in a computer readable memory. A state class is created that has at least one field and at least one proxy method and a behavior class version that includes at least one method on the basis of the input class. At least one method call of the state class is redirected to the behavior class version. Also, an arrangement and a computer-software are disclosed.

14 Claims, 5 Drawing Sheets

METHOD AND ARRANGEMENT FOR RE-LOADING A CLASS

PRIOR APPLICATION

This is a US national phase application that claims priority from Finnish Application No. 20070366, filed 9 May, 2007.

TECHNICAL FIELD OF INVENTION

The invention relates to a method and arrangement for loading classes in a computer system.

BACKGROUND AND SUMMARY OF THE INVENTION

Development and testing of an application program in environments such as Java™ often require constant switching between code writing and running. The re-starting of application e.g. for testing after making changes to the source code is often a quite time and resource consuming task.

The runtime environments, e.g. Java™, where the application code may be run, are often large and complex. Since the first release of Java™ language Java developers could not benefit from rapid development as Java Virtual Machine (JVM) did not support a way to reload classes after they have been loaded at least once by some class loader. Starting the environment and application program for testing may thus require a relatively long time, e.g. even several minutes, because classes of the needed runtime environment along with classes of the application need to be re-loaded even if only one of the application's classes was changed.

A standard JVM supports reloading class loaders (a standard, modifiable component of a Java environment) along with all their classes. However, in such a case all the current class instances were lost, unless explicitly preserved via e.g. serialization. This was used to support application redeployment, but could not be used for supporting any generic fine-grained reloading.

Another approach called HotSwap for reloading classes while debugging is known in the prior art. It only allows changing the method bodies, not allowing updates to method signatures, classes and fields. Because of its limitations, this approach does not satisfy most programmers and is rarely used.

A scientific publication by Mikhail Dmitriev (a dissertation submitted for the Degree of Doctor of Philosophy, Department of Computing Science, University of Glasgow, March 2001) with title "Safe Class and Data Evolution in Large and Long-Lived Java™ Applications" provides an overview about some prior art solutions for reloading classes. The publication discusses solutions for the following interrelated areas: consistent and scalable evolution of persistent data and code, optimal build management, and runtime changes to applications.

U.S. Patent application US20020087958 teaches a method and apparatus of transforming a class. The method involves creating modified class such that each access to class field is replaced by invocation of access function for fetching. In the disclosed method, the class is split and converted into a modified class and/or a helper class.

After the transformation, a safe class sharing among several processes is achieved whereby the startup times and the memory usage for the processes are reduced. The inter-process communication (IPC) becomes faster.

U.S. Patent application US20040168163 teaches a system and method for shortening class loading process in Java program. The method and system has a class loader performing linking and initialization processes to generate run time data which is stored in accessible state in memory.

U.S. Pat. No. 6,901,591 discloses frameworks for invoking methods in virtual machines. The disclosure provides an internal class representation data structure for use by virtual machine at runtime. The data structure comprises method and a reference cell corresponding to the method.

U.S. Pat. No. 6,092,079 discloses an apparatus and method for updating an object without affecting the unique identity of the object. In the disclosed method, a second object is created which is an instance of a first class. The data from the first object is copied into the second object. The method table pointer of the first object is then changed to the method table of the second class. The data section of the first object is then reallocated according to the data requirements of the second class. The data in the second object is then converted to data in the first object. The resultant first object has both methods and data updated to the second class without passivating the object.

U.S. Pat. No. 5,974,428 teaches a method and apparatus for class version naming and mapping. In an embodiment of the disclosed invention, a class versioning and mapping system allows a user to request a desired class without knowing which class version is the most recent or correct version for the desired class. The class versioning and mapping system uses a version mapping mechanism to cross reference the requested class, select the most recent or best version of the requested class, and then return an object to the user that belongs to the selected class.

The prior art fails to teach a method and arrangement that allows efficiently re-loading a changed class into a runtime environment without re-loading a number of other, unchanged classes at the same time. A solution for efficiently re-loading classes whose body, interface and/or attributes have changed, is therefore desired.

The object of the present invention is to provide a method and system for efficiently re-loading changed classes in a computer arrangement comprising a run-time environment such as Java™ Virtual Machine.

The invention discloses a method, arrangement and computer program to re-load a changed class in a run-time environment.

Class reloading method and arrangement of the present invention is based on a combined effect of a plurality of functional components. One such functional component comprises a method to split the original class into a state class that will hold the state (i.e. attributes and their values) and a behavior class that will hold static program code derived from the code of the original class. The split may be performed during runtime e.g. by generating the state and behavior classes from the original class and deploying at least one of the generated classes in the runtime environment.

A further possible component comprises functionality to simulate the signature of the original class in the state class by proxying every method call in the state class through a runtime environment to a method of the last version of the respective behavior class. "Proxying" in this context means e.g. generating a proxy method e.g. in the state class that forwards the method call to another class.

A yet further possible component comprises functionality to redirect method calls made from the versioned code class through runtime system using reflection to ensure that last version of a behavior class is called. By using reflection, the use of default virtual machine invocation logic may be avoided. Reflection is functionality provided e.g. by a Java runtime environment (JRE).

In the present invention, actual class reloading into the runtime environment may occur e.g. when the file containing the original class is updated and a new versioned behavior class is created (generated) on the basis of the modified original class. The runtime system of the present invention makes sure that all subsequent method calls will be redirected to the latest version of the behavior class.

An aspect of the invention is a computer executable method for deploying an input class during runtime in a computer readable memory. The method is characterized in that the method comprises steps of (a) creating on the basis of the input class a state class comprising at least one field and at least one proxy method and a behavior class version comprising at least one method and (b) redirecting at least one method call of the state class to the behavior class version.

The correct version of the behavior class may be determined e.g. by a redirecting service. The version of the behavior class, to which the method call should be redirected, may further be determined during runtime.

The creation of the state class and/or the behavior class may be performed during runtime.

The redirecting service may invoke at least one method using reflection.

The behavior class may comprise version information.

A method of said behavior class may comprise a call to a method of a class of the redirecting service.

The method of the state class may comprise a call to a method of a class of said redirecting service.

Creating a class in this context means e.g. generating the class and deploying it in the computer readable memory for use of e.g. a runtime environment, e.g. a Java™ runtime environment.

The computer readable memory may contain a runtime environment that may be an object oriented runtime environment, e.g. a Java™ runtime environment.

The class may be a class of any suitable object oriented development and/or runtime environment e.g. a Java™ class.

Another aspect of the invention is an arrangement for deploying an input class in a computer readable memory during runtime. The arrangement is characterized in that it comprises means for (i) creating (generating) from the input class a state class comprising at least one field and at least one proxy method and (ii) means for creating (generating) from the input class a behavior class version comprising at least one method and (iii) means for redirecting at least one state class method call to the behavior class version.

The correct version of the behavior class to be used may be determined e.g. by the redirecting means.

Yet another aspect of the invention is software for deploying an input class in a computer readable memory during runtime, said software comprising computer executable program code for (i) creating (generating) from the input class a state class comprising at least one field and at least one proxy method, (ii) creating from the input class a behavior class version comprising at least one method and (iii) redirecting at least one state class method call to the behavior class version.

The correct version of the behavior class to be used may be determined e.g. by the redirecting program code of the software.

Some embodiments of the invention are described herein, and further applications and adaptations of the invention will be apparent to those of ordinary skill in the art.

BRIEF DESCRIPTION OF DRAWINGS

In the following, some embodiments of the invention are described in greater detail with reference to the accompanying drawings in which.

DETAILED DESCRIPTION OF THE DRAWINGS

In the following detailed description, words that have a special meaning in Java™ development and/or runtime environments and application programming language are written in courier font. Such words are e.g. the reserved words (e.g. static or public) of the Java programming language. Also example code snippets are written using courier font.

Figure 1:
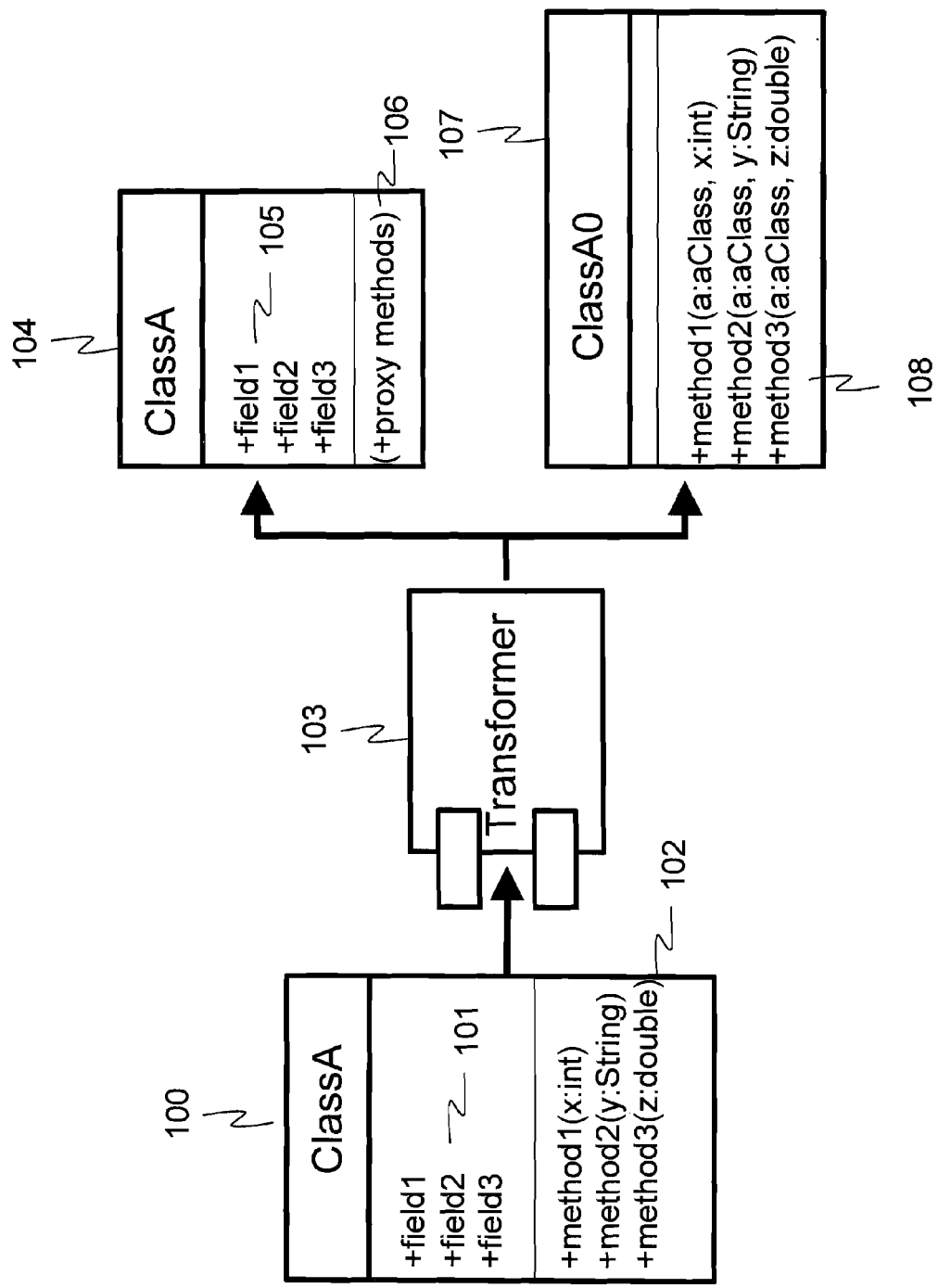
FIG. 1 shows an exemplary method of transforming a class.

To make a class re-loadable efficiently in a runtime environment according to an embodiment of the invention, the original (input) class written e.g. by an application programmer or generated by an application development environment needs to be transformed into a plurality of classes as shown in FIG. 1. The input class 100 that comprises both fields (also referred to as attributes or member variables) 101 and methods 102 is provided as an input to a transformation component 103 that produces two classes, a state class 104 and a behavior class 107, from the input class 100. In one embodiment, the class transformation process comprises one or more of e.g. following operations to transform the input class into a state class:

- Modifiers of state class 104 are the same as class modifiers of input class 100. If the method was "synchronized" (as used in Java™ environment) it is omitted.
- Superclass of state class 104 (i.e. the class from which the state class inherited) is the same as superclass of the input class 100.
- State class 104 implements a RuntimeVersioned marker interface (using standard interface programming means of Java™ environment) in addition to input class 100 implemented interfaces to express that there is a versioned behavior class corresponding to the state class 104.
- Fields specified in the input class 100 (both static and non-static) are left as is 105 in the state class 104. One or multiple additional "synthetic" fields may be added to the state class 104.
- Methods specified in the input class 100 (both static and non-static) are replaced in the state class 104 with proxy methods 106 that redirect the call to the runtime redirector component. The names and signatures of the proxy methods stay as is.
- Constructors (methods that create an instance of a class) are transformed as described later in this disclosure.
- Static initializers are copied as is.

The class transformation process also creates (generates) a re-loadable versioned behavior class 107 from the input class 100. This transformation process executed by the transformer component 103 may comprise any number of operations (or all of them) from the following set of operations:

- Behavior class 107 is declared "public" and "abstract" using Java™ programming means.
- The super class of the behavior class 107 is made the same as super class of input class 100. Suitably, the behavior class 107 does not implement any Java™ "interface"s.

All fields (both static and non-static as specified in Java environment) of the input class are omitted from the behavior class 107.

Every static method 108 of the behavior class 107 is set to be public. The body of the method is copied applying e.g. the method transformation described later in this disclosure.

Some or all virtual methods 102 are modified to be Java™ public static" methods 108 and take the state class 104 as the first parameter. The body of the method is copied applying method transformation described later in this disclosure.

Some or all "constructors" (as known to a Java application developer) are transformed as described later in this disclosure.

"Static initializers" (as known to a Java application developer) are left out.

In some embodiments, the only connection between the generated classes 104 and 107 is the extra parameter of type class 104 taken by the (ex-virtual) methods in class 107. They do not refer to each other in any other way. The scheme described in FIG. 1 preserves the "extends" relation (object inheritance in Java™ environment) between original classes in proxies.

As part of the transformation process, each method body in the versioned behavior class must be transformed to make calls through the runtime redirector component. This means for example that the INVOKE* and GET*/PUT* instructions of the Java Virtual Machine must be transformed to calls into the runtime redirector component.

In some embodiments, all method parameters are wrapped into an object array. This involves boxing all basic types into appropriate object wrappers.

The following table shows an example of how to convert JVM instructions into runtime redirector method calls. In the example, it is assumed that the "parameters" on stack is the wrapped object array of method call parameters.

| JVM Instruction | Runtime redirector method |
| --- | --- |
| INVOKESTATIC C.m:d<br>Stack: parameters | invokeStatic(parameters, "C", "m", "d") |
| INVOKEVIRTUAL C.m:d<br>Stack: target, parameters | invokeVirtual(target, parameters, "C", "m", "d") |
| INVOKESPECIAL C.m:d<br>Stack: target, parameters<br>Surrounding class: S | if m is private: invokeVirtual (target, parameters, "C", "m", "d")<br>otherwise: invokeSuper(target, parameters, "S", "C", "m", "d") |
| INVOKEINTERFACE C.m:d<br>Stack: target, parameters | invokeVirtual(target, parameters, "C", "m", "d") |
| GETFIELD C.f:d<br>Stack: target | getFieldValue(target, "C", "f", "d") |
| GETSTATIC C.f:d<br>Stack: | getFieldValue(null, "C", "f", "d") |
| PUTFIELD C.f:d<br>Stack: target, value | setFieldValue(target, value, "C", "f", "d") |
| PUTSTATIC C.f:d<br>Stack: value | setFieldValue(null, value, "C", "f", "d") |

Figure 2:
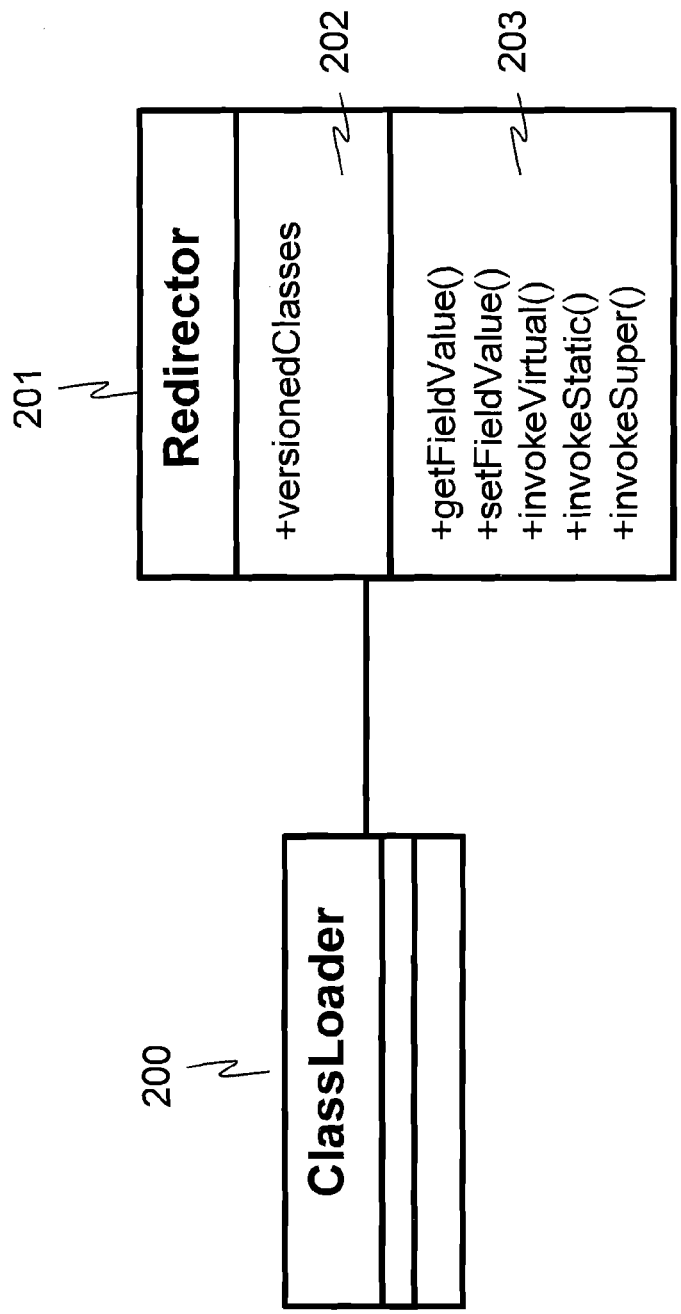
FIG. 2 depicts an exemplary class implementing a redirecting service.

After the conversion process the state and behavior classes that have been generated from the input class are now ready for use in an application program that may be already running in a runtime environment. FIG. 2 shows a runtime redirector component of an embodiment of the present invention that has been implemented so that it comprises at least a Redirector class 201 that is associable with a ClassLoader class 200. The Redirector class 201 comprises one or multiple fields 202, e.g. an array of references to versioned classes it manages. The Redirector class 201 also comprises methods 203 needed to perform the redirecting services.

In one embodiment, the methods 203 comprise for example the following:

```
Object getFieldValue(Object obj,
                     String classname,
                     String fieldname,
                     String descriptor)
void setFieldValue(Object obj,
                   Object value,
                   String classname,
                   String fieldname,
                   String descriptor)
Object invokeVirtual(Object target,
                     Object[ ] parameters,
                     String classname,
                     String methodname,
                     String descriptor)
Object invokeStatic(Object target,
                    Object[ ] parameters,
                    String classname,
                    String methodname,
                    String descriptor)
Object invokeSuper(Object target,
                   Object[ ] parameters,
                   String fromClassname,
                   String toClassname,
                   String methodname,
                   String descriptor)
```

The signatures (list of parameters) of the runtime methods shown above correspond to the JVM INVOKE* and GET*/PUT* instruction parameters. The class name and descriptor parameters are given in JVM internal form (descriptor contains the types of all parameters and return value in case of method). The functionality and use of the JVM instructions and their parameters are well known to a person skilled in the art.

The purpose of the runtime redirector component is to find the correct version of a behavior class for each method call and redirect the method call to that version of the class. Unlike the default JVM method application, the runtime redirector will first try to find the method in the versioned classes. Thus, if methods have been added, removed or changed to a class during runtime of the application, the changes will be taken into consideration.

In some embodiments, the calls from methods of a versioned behavior class will be redirected to calls to methods of versioned behavior class directly, without a need to call proxy methods of the corresponding state class. The proxy method of a state class thus serves typically only as a gateway for the non-versioned classes not managed by the runtime redirector component, which can call its methods directly and still benefit from the class reloading.

Field access methods are needed to access private fields and also handle freshly added fields.

In some embodiments, the runtime redirector component uses "reflection" (as known to a person skilled in the art of Java™ application development) to call the correct method in the end and it requires security bypass to call private methods. In a Java™ environment, the reflection API represents, or reflects, the classes, interfaces, and objects in the current Java Virtual Machine. With the reflection API one can for example:

Determine the class of an object.

Get information about a class's modifiers, fields, methods, constructors, and superclasses.

Find out what constants and method declarations belong to an interface.

Create an instance of a class whose name is not known until runtime.

Get and set the value of an object's field, even if the field name is unknown to your program until runtime.

Invoke a method on an object, even if the method is not known until runtime.

Create a new array, whose size and component type are not known until runtime, and then modify the array's components.

In an embodiment of the invention, the default Reflection API implementation of a standard Java™ runtime environment may need to be at least partially overridden to allow redirecting calls to the runtime redirector. Such embodiment makes it possible e.g. to make reflective calls to methods that did not exist originally. Additionally the changes to methods, fields and constructors need to be shown to appear in the API. In one embodiment, this means that the following methods of java.lang.Class class available in a Java™ environment must be altered:

getDeclaredMethod( ) and getDeclaredMethods( ) result must reflect added/removed/changed methods of behavior classes accordingly.

getMethod( ) and getMethods( ) result must reflect added/removed/changed public methods of behavior classes in the current and all super classes accordingly.

getDeclaredConstructor( ) and getDeclaredConstructors( ) result must reflect added/removed/changed constructor methods of behavior classes accordingly.

getConstructor( ) and getConstructors( ) result must reflect added/removed/changed constructor methods accordingly.

getDeclaredField( ) and getDeclaredFields( ) result must reflect added/removed/changed static and non-static fields accordingly.

getField( ) and getFields( ) result must reflect added/removed/changed static and non-static public fields in the current and all super classes accordingly.

getInterfaces( ) result should reflect added/removed/changed implemented "interface"s.

The changes in java.lang.Class class can be done using instrumentation techniques known to a person skilled in the art, causing it to consult e.g. runtime redirector's versioned class directory before returning results.

Figure 3:
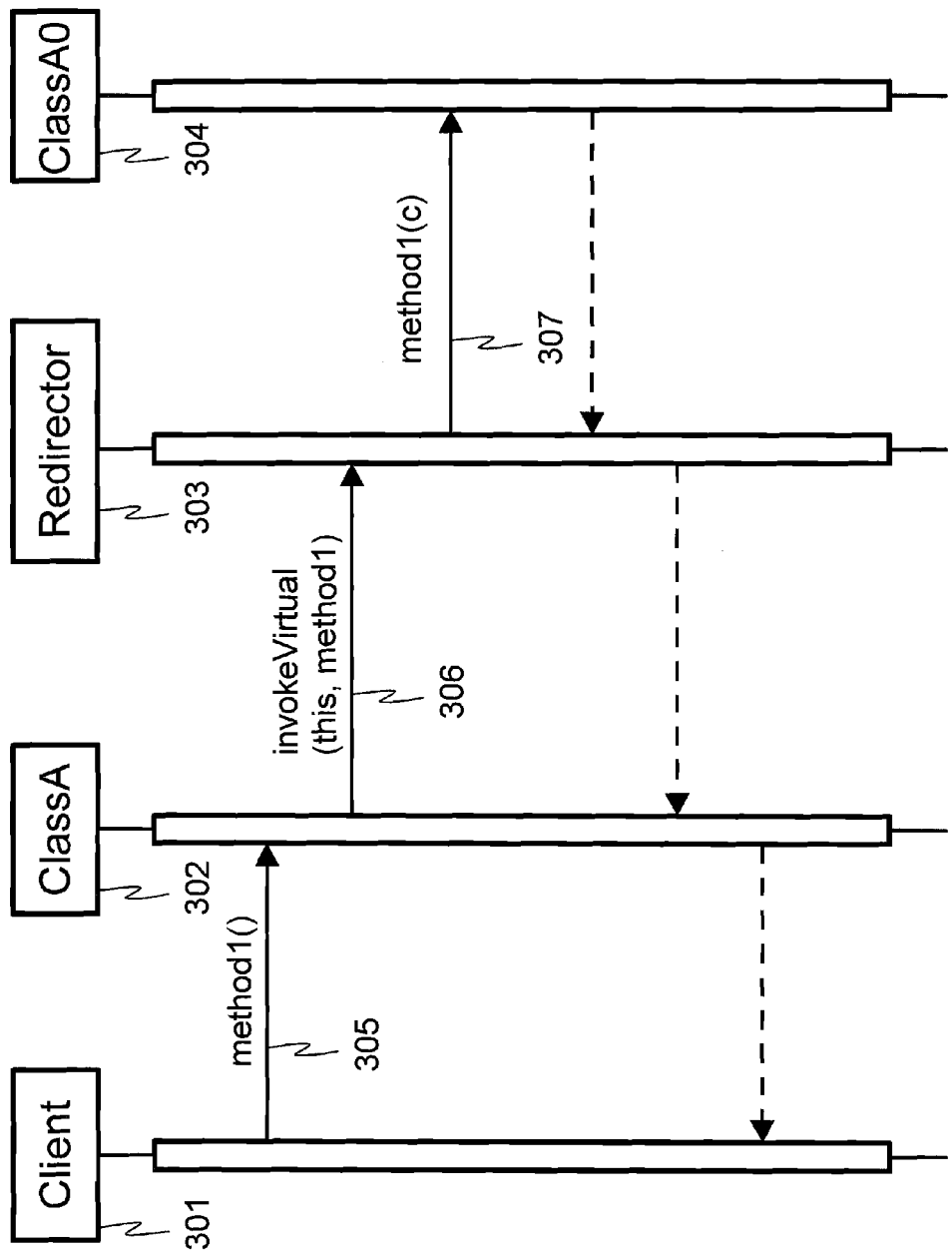
FIG. 3 shows an example about redirecting a method call to a versioned class through the state class proxy method.

FIG. 3 shows a method invocation diagram about redirecting a method call from a state class (104 in FIG. 1) to a correct version of a behavior class (107 in FIG. 1). A method in an object 301 calls method1( ) 305 of class ClassA 302. The class 302 is a state class that has only a proxy of the called method. The proxy method contains a invokeVirtual( ) method call 306 to the Redirector class 303. The Redirector resolves the most recent version of the behavior class 304 and calls the method1( ) 307 of the behavior class. The state class 302 is added as a parameter to the method call 307. Should the method1( ) return a value, it may be returned back to Redirector, further to the state object 302 and finally to the calling client 301.

Figure 4:
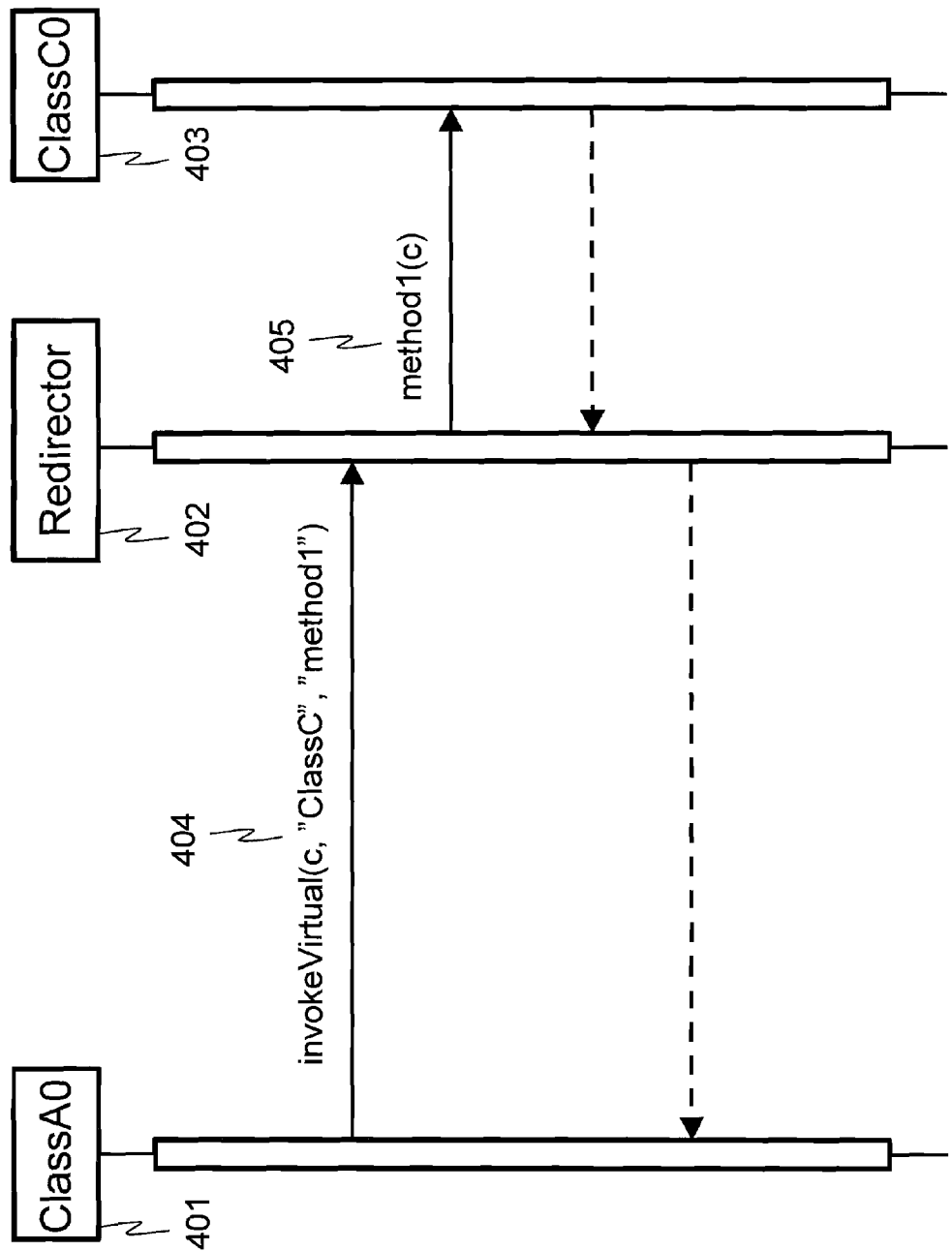
FIG. 4 shows another example about redirecting a method call to a versioned class directly.

FIG. 4 depicts a method invocation diagram about calling a method of a versioned class from another versioned class. The calling class 401 doesn't need to call the state class. Instead, it calls 404 the Redirector 402 that further calls 405 the correct (e.g. latest) version 403 of the behavior class.

Figure 5:
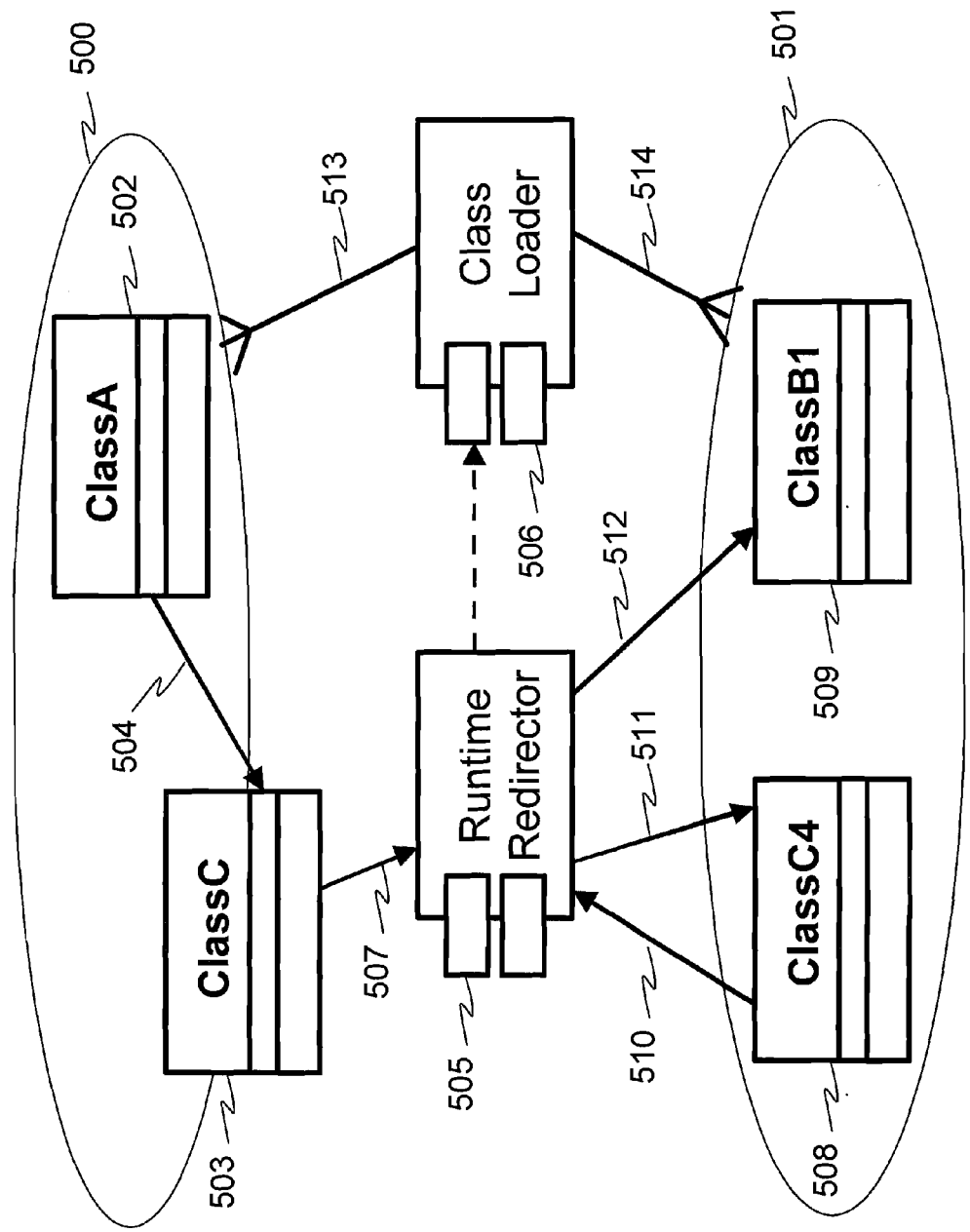
FIG. 5 shows yet another example about redirecting method calls between different classes according to an embodiment of the invention.

FIG. 5 depicts an overall view about an arrangement of classes according to an embodiment of the present invention. The arrangement comprises a set 500 of unversioned classes 502, 503 and a set 501 of versioned classes 508, 509. One ("ClassA") of the shown unversioned classes 502 is a class that is not associated with the runtime redirector component 505 at all. Another one ("ClassC") of the unversioned classes is a state class 503 that has a corresponding versioned behavior class 508 ("ClassC4") among the set of versioned classes 501. There's also a versioned behavior class 509 ("ClassB1") among the versioned classes that doesn't have a corresponding state class shown in the picture (although such class would exist in a real running system). The runtime redirector 505 is associated with at least one ClassLoader component 506 who loads the versioned 500 and unversioned 501 classes into the computer's memory when needed. ClassLoader should in this context be understood as a ClassLoader of a Java™ environment. The ClassLoader 506 has thus an association 513, 514 with the versioned and unversioned classes. When an unversioned class 502 calls a method of a versioned class 508, it must send the method call 504 (e.g. method1( )) to the state class 503 related to the behavior class 508. The state class forwards 507 the method call to the runtime redirector component 505. At this phase, the method call is invokeVirtual ("ClassC", "method1"). (For clarity, some details may be omitted in the examples. Those details are apparent to a person skilled in the art.) The first parameter of this method call identifies the name of the class and the second parameter identifies the name of the method of the class. The redirector runtime determines the correct recipient "ClassC4" 508 for the method call and forwards 511 the call to the class. At this phase, the method call is again method1( ). If a versioned behavior class 508 calls 510 a method of another versioned class 509, the call is sent from the calling class 508 to the redirector runtime 505 as a invokeVirtual ("ClassB", "method2") call 510. In this example, the name of the class is "ClassB" and the method of the class to be called is "method2( )". The runtime redirector resolves the correct version of the versioned behavior class "ClassB1" 509 and sends the method2( ) call 512 to the class.

In the following, an example with programming code is provided to further illustrate some embodiments of the present invention. For convenience, Java code notation is used in this example although the same principles may be applicable in other object-oriented programming and runtime environments.

An original (input) class of this example is defined as follows:

```
public class C extends X {
    int y = 5;
    int method1(int x)   {
        return x + y;
    }
    void method2(String s)   {
        System.out.println(s);
    }
}
```

The class of the example has name C, it extends (inherits from) class X, it has one field (y) and two methods (method1 and method2).

In an embodiment of the present invention, the original input class is transformed into two classes, a state class and a behavior class.

The state class can now be generated from the input class to be as follows.

```
public class C extends X {
    int y = 5;
    int method1(int x)   {
        Object[ ] o = new Object[1];
        o[0] = x;
        return RedirectorRuntime.invokeVirtual(this,
            o, "C", "method1", "(I)I");
    }
    void method2(String s)   {
        Object[ ] o = new Object[1];
        o[0] = s;
        return RedirectorRuntime.invokeVirtual(
            this, o, "C", "method2", "(Ljava/lang/String;)V");
    }
}
```

The behavior class can now be generated from the input class to be as follows:

```
public abstract class C0 {
    public static int method1(C c, int x)   {
        int tmp1 = RedirectorRuntime.getFieldValue(c, "C", "y", "I");
        return x + tmp1;
    }
    public static void method2(C c, String s)   {
        PrintStream tmp1 =
            RedirectorRuntime.getFieldValue(
                null, "java/lang/System", "out",
                "Ljava/io/PrintStream;");
        Object[ ] o = new Object[1];
        o[0] = s;
        RedirectorRuntime.invokeVirtual(
            tmp1, o, "java/io/PrintStream;", "println",
            "(Ljava/lang/String;)V");
    }
}
```

This example case is left without any special handling or optimization for simplicity.

Now the original class C may be updated e.g. by an application developer or a code generation program of an application development environment, e.g. as shown in the following code example:

```
public class C {
    int y = 5;
    int z( ) {
        return 10;
    }
    int method1(int x)   {
        return x + y + z( );
    }
    ...
}
```

The original class has now one new method ("z( )") and the "method1( )" of the class has been altered. These changes should now be implemented in the runtime environment without re-starting the environment or re-loading a number of unchanged classes. To achieve this goal, a new version of the behavior class is generated after the update of the original class. The new version of the behavior class is then loaded into the runtime system's memory, the runtime redirector service is notified about the new version of the behavior class and all further calls to the methods of the modified class are to be redirected to the new version of the behavior class.

```
public class C1 {
    public static int z(C c)   {
        return 10;
    }
    public static int method1(C c, int x)   {
        int tmp1 = RedirectorRuntime.getFieldValue(c,
            "C", "y", "I");
        int tmp2 = RedirectorRuntime.invokeVirtual(c,
            null, "C", "z", "(V)I");
        return x + tmp1 + tmp2;
    }
    ...
}
```

Because the state class was not updated, it is not necessary to reload it into the memory. Thus, the state of the existing instances is preserved even though the implementation of the class has been altered.

In some embodiments, fields may be added to the original class. To handle these added fields, a synthetic field, e.g. of name _RUNTIME_FIELDS_ and of type Map, is added to every generated state class. This will allow holding the values for added fields in the _RUNTIME_FIELDS_ values with concatenated field name and type descriptors serving as keys. This will also handle the case when the field type changes, but name doesn't as the key will change. The getFieldValue( )/setFieldValue( ) methods of the runtime redirector (201 in FIG. 2) need to be implemented so that they search for field values in the _RUNTIME_FIELDS_ map first. An example state class may then look e.g. like the following:

```
public class C extends X {
    private Map _RUNTIME_FIELDS_ = new HashMap( );
    int y = 5;
    //Rest of the class...
}
```

Java™ environment allows implementation of "synchronized" methods. In one embodiment of the invention, such methods are replaced by non-synchronized methods that have a "synchronized" block over the proxy instance in the versioned class method. Since proxy methods, i.e. methods of the state class that just forward the method call to the runtime redirector, do not access any global values they are safe to be unsynchronized. Assuming that method1( ) of a class C was declared synchronized the resulting behavior class will in one embodiment look like this (state class will stay the same):

```
public abstract class C0 {
    public static int method1(C c, int x)   {
        synchronized (c) {
            int tmp1 = RedirectorRuntime.getFieldValue(c, "C", "y", "I");
            return x + tmp1;
        }
    }
    //Rest of the class...
}
```

To access methods of unversioned superclasses, accessor methods are generated in some embodiments with prefix _RUNTIME_SUPER_ for all unversioned super methods that are overridden in the proxy. The runtime redirector's invokeSuper method should call the topmost such method if a super call to unversioned class is to be made. An example about a state class may then look e.g. like the following:

```
public class C extends X {
    int y = 5;
    int method1(int x) {
        Object[ ] o = new Object[1];
        o[0] = x;
        return RedirectorRuntime.invokeVirtual(this, o, "C", "method1",
"(I)I");
    }
    int _RUNTIME_SUPER_method1(int x) {
        return super.method1(x);
    }
    //Rest of the class...
}
```

In the above example, it is assumed that class X is unversioned and also has a method int method1(int).

In some embodiments, it is also possible to generate a _RUNTIME_SUPER_ method for each directly or indirectly inherited method in the topmost unversioned class only. This will increase this class size, but can make invokeSuper method work simpler.

Because of limitations imposed by Java runtime environment, constructors need to be treated differently from other virtual methods, although semantically constructors are just a virtual method of a particular name and type. In some embodiments, the transformer (103 in FIG. 1) generates a _RUNTIME_INIT_ static method with same type except for the state class added as first argument instead of each constructor in the original class. In addition, the transformer generates a constructor with a slightly different signature for each constructor in the original class superclass. A RuntimeVersioned marker interface ("interface" should here be interpreted as an interface of a Java™ programming language) is added as the last type. The purpose of this constructor is to be called when a super constructor call (i.e. call of a constructor method of a Java™ superclass) is required (constructors being subject to the same limitations as usual methods). These constructors will just call the super ones. In one embodiment, a state class and its constructor may look e.g. like the following:

```
public class C extends X {
    int y = 5;
    public C( ) {
        Object[ ] o = new Object[1];
        o[0] = c;
        //Not valid in Java, but possible in bytecode
        Return RedirectorRuntime.invokeStatic(
            null, o, "C", "_RUNTIME_INIT_", "(C)C");
    }
    public C(RuntimeVersioned o) {
        super( );
    }
    //Rest of the class...
}
```

In the above example, original class C must necessarily have a default constructor with no arguments that just calls super( ).

The behavior class in this embodiment may look e.g. like the following:

```
public abstract class C0 {
    public static C _RUNTIME_INIT_(C c) {
        //Not valid in Java, but possible in bytecode
        c.<init>((RuntimeVersioned) null);
    }
    //Rest of the class...
}
```

There is little needed to handle calls to interfaces in the class conversion and runtime redirector process. The behavior classes are not generated for interfaces and the state classes correspond almost one-to-one with the original. Since all versioned calls are done using reflection, the INVOKE_INTERFACE primitive may always be treated same as a usual virtual call. The use of reflection allows weak type checking in method calls instead of strong types in e.g. a Java™ environment. Or in other words, use of reflection allows dynamic method calls instead of static calls.

When calling a public static method in an embodiment of the invention, it is known during class loading whether the loaded class is managed by the runtime redirector (201 in FIG. 2) or not. Thus the calls to the unmanaged classes are left as is, and only calls to managed versioned classes are redirected using the runtime redirector. Same solution applies also to the public static fields.

When calling a static method with any visibility from inside the same class, the versioned class method can be called directly in an embodiment of the invention.

When calling a private virtual method from inside the same class, the versioned class method can be called directly in an embodiment of the invention.

When calling a public virtual method, two alternatives are possible according to an embodiment. If the class is not managed and its virtual method is final or the class is final, the virtual method can be called directly. However, if the class is not versioned, code may be generated to test whether the instance of class implements the RuntimeVersioned marker interface (for details, see description of FIG. 1). In such a case, the call needs to be redirected through the runtime redirector. Otherwise the call may be made directly.

There are some issues related to inheritance (class hierarchy) that are useful to be addressed. In one embodiment an issue regarding overriding of an unmanaged class C (i.e. class whose method calls are not managed by the runtime redirector) method m by a managed subclass C' method m is solved. If the call is made through the runtime redirector it will resolve the method m correctly to class C'. However if the call comes from an unmanaged class, runtime redirector may not be involved, and the wrong method C.m would be called.

This issue can be solved for example by making calls to managed classes go through the runtime redirector, including ones made to the methods implemented by superclasses (i.e. classes from which other classes are inherited). This is done by generating a proxy method (with same modifiers and signature) for each of the overridden methods, thus making sure the runtime redirector is involved in resolving the method to call.

The above embodiment is an extension of the proxy method generation taught in another embodiment. The extension makes the proxy method generation more intrusive, since the inherited methods will now show up in Class.getDeclaredMethods( ) reflection calls. This might cause some problems with code that does not expect that (e.g. Java bean handling code). However this problem can be solved by overriding reflection as taught in this disclosure and then ignoring the extra generated methods.

The embodiments taught herein may be further optimized for runtime use. The runtime redirector provides methods similar to the JVM instructions. However JVM instructions use the constant pool to reuse string constants, referring to them by integer indexes. The same approach can be applied in the runtime redirector, redefining the runtime methods to accept integer indexes instead of class names and method names (including type descriptor). The runtime redirector could have for example the following interface after constant pool introduction:

```
Object getFieldValue(Object obj,
    long classname,
    long fieldnameWithDescriptor)
void setFieldValue(Object obj,
    Object value,
    long classname,
    long fieldnameWithDescriptor)
Object invokeVirtual(Object target,
    Object[ ] parameters,
    long classname,
    long methodnameWithDescriptor)
Object invokeStatic(
    Object[ ] parameters,
    long classname,
    long methodnameWithDescriptor)
Object invokeSuper(Object target,
    Object[ ] parameters,
    long fromClassname,
    long toClassname,
    long methodnamewithDescriptor)
```

The main advantage of building a constant pool is that then the same indexes can be used to create a dictionary of classes and methods using array structures. Such structures are efficient to access compared to hash tables and similar structures. This may increase runtime performance of the crucial runtime redirector methods.

However the above approach means that a dictionary of all classes needs to be made accessible to the runtime redirector. This may result as a noticeable memory overhead. Considering that Java™ ClassLoader hierarchy allows several versions of same class in unrelated ClassLoaders, a choice needs to be made between having a full dictionary per ClassLoader or having a complex system of dependencies between constant pools.

The embodiments of the invention allow altering classes in a flexible manner and deploying the altered classes in an already running runtime environment in a quick and resource efficient manner. Thus, the various embodiments of the invention disclosed herein allow e.g. significant performance improvements e.g. in application development environments where both application programming and testing work may be performed.

To a person skilled in the art, the foregoing exemplary embodiments illustrate the model presented in this application whereby it is possible to design different methods and arrangements, which in obvious ways to the expert, utilize the inventive idea presented in this application.

While the present invention has been described in accordance with preferred compositions and embodiments, it is to be understood that certain substitutions and alterations may be made thereto without departing from the spirit and scope of the following claims.

I claim:

1. A computer executable method for deploying an input class during runtime in a computer virtual machine, comprising:
    creating by a processor during runtime on a basis of the input class a state class comprising at least one field and at least one proxy method and on the basis of the new revision of the input class a behavior class version comprising at least one method, and
    redirecting by a processor during runtime at least one method call of the state class to the behavior class version through the proxy method,
    wherein the method is performed without restarting the virtual machine and without establishing a safe state in the virtual machine, where achieving a safe state means selectively preventing processing pipeline operations related to the input class.

2. A method according to claim 1, wherein the input class is a Java™ class compatible with the first, second or third edition of the JAVA™ Language Specification and the virtual machine is compatible with the first or second edition of the JAVA™ Virtual Machine Specification.

3. A method according to claim 1, wherein a method call of the state class is redirected through the proxy method to a behavior class version using a redirecting service.

4. A method according to claim 3, wherein the method call of the state class is redirected to the behavior class version using reflection.

5. A method according to claim 1, wherein the behavior class version, to which the method call is redirected, is determined during runtime.

6. A method according to claim 1, wherein a name of the behavior class comprises version information.

7. The method of 1, wherein the computer virtual machine loads and executes bytecode representations of the input classes, and does not itself provide a way to load a new revision of an existing input class.

8. A system for deploying an input class in a computer virtual machine during runtime, comprising:
    a processor; and
    a computer readable memory including instructions for implementing a computer virtual machine connected to the processor;
    wherein the processor is configured to perform the steps of
        creating during runtime of the computer virtual machine from the input class a state class comprising at least one field and at least one proxy method,
        creating during runtime of the computer virtual machine on the basis of the new revision of the input class a behavior class version comprising at least one method, and
        redirecting during runtime of the computer virtual machine at least one method call to the state class to the behavior class version through the proxy method,
    wherein the redirecting takes place without restarting the virtual machine and without establishing a safe state in the virtual machine, where establishing a safe state means selectively preventing processing pipeline operations related to the input class.

9. The system of claim 8, wherein the computer virtual machine is configured to load and execute bytecode representations of the input classes, and is not configured to provide a way to load a new revision of an existing input class.

10. The system of claim 8, wherein the input class is compatible with the first, second or third edition of the JAVA™

Language Specification and the virtual machine is compatible with the first or second edition of the JAVA™ Virtual Machine Specification.

11. A computer executable method for deploying a new revision of an input class in a computer virtual machine during runtime, comprising:
   creating by a processor during runtime on a basis of the input class a state class comprising at least one field and at least one proxy method, and on a basis of the new revision of the input class a behavior class version comprising at least one method, and
   switching from using a previous input class revision to using a new input class revision by having a redirecting service redirect method calls to the latest behavior class version through the proxy method,
   wherein the redirecting takes place without restarting the virtual machine and without establishing a safe state in the virtual machine, where establishing a safe state means selectively preventing processing pipeline operations related to the input class.

12. A method according to claim 11, wherein a name of the behavior class comprises version information.

13. A method according to claim 11, wherein the input class is compatible with the first, second or third edition of the JAVA™ Language Specification class and the virtual machine is compatible with the first or second edition of the JAVA™ Virtual Machine Specification.

14. The method of claim 11, wherein the computer virtual machine loads and executes bytecode representations of the input classes, and does not itself provide a way to load a new revision of an existing input class.

* * * * *